United States Patent [19]

Debrey

[11] 4,166,713
[45] Sep. 4, 1979

[54] AUXILIARY LIQUID TANK

[76] Inventor: James L. Debrey, P.O. Box 1584, Springfield, Ill. 62705

[21] Appl. No.: 817,005

[22] Filed: Jul. 18, 1977

Related U.S. Application Data

[63] Continuation of Ser. No. 652,222, Jan. 26, 1976, abandoned.

[51] Int. Cl.² ............................................. F04B 49/04
[52] U.S. Cl. ....................................... 417/40; 417/36; 417/63; 417/441
[58] Field of Search .................... 340/214, 410, 244 A, 340/244 B; 417/40, 199 A, 200, 63, 434, 441, 557, 36, 38; 137/599, 797, 68 R; 415/121 A, 168, 169

[56] References Cited

U.S. PATENT DOCUMENTS

| 173,662 | 2/1876 | Pease | 417/557 X |
| 1,002,822 | 9/1911 | Cowles et al. | 137/599 X |
| 2,057,624 | 10/1936 | Burkhart | 417/557 X |
| 2,370,099 | 2/1945 | Werder | 340/410 |
| 3,172,377 | 3/1965 | Dewar | 137/797 X |
| 3,436,727 | 4/1969 | Pagano | 340/244 A |

FOREIGN PATENT DOCUMENTS

| 222914 | 6/1910 | Fed. Rep. of Germany | 417/40 |
| 669368 | 11/1929 | France | 417/40 |
| 1106795 | 12/1955 | France | 340/244 B |

Primary Examiner—Carlton R. Croyle
Assistant Examiner—Edward Look
Attorney, Agent, or Firm—Ralph F. Staubly

[57] ABSTRACT

The disclosure is a system for increasing the reliability of systems for keeping auxiliary liquid-holding tanks filled and reliably functional. A float-operated switch cycles an electric pump to maintain the liquid level between full and nearly full, and a back-flow-preventing check valve is employed and modified (apertured and/or bypassed) to permit slow back leakage to "exercise" the system. The pump, its input to the tank, and the check valve are all located below the pump-turn-on level so that they never lose their prime. One arrangement for testing liquid-level control has a float on a lever arm that operates both the pump-motor-cycling switch and also a low-level switch to energize an alarm. The lever arm also rotates a shaft carrying an indicator dial and/or pointer. The shaft has a manually engageable knob or lever for submerging the float to test the operability of the pump, the alarm, and other parts. A second species of the liquid-level control has a float-operated and manually engageable vertical plunger for submerging the float for operating and testing a level indicator, switches for the pump and the alarm, and other parts.

10 Claims, 3 Drawing Figures

AUXILIARY LIQUID TANK

This application is a continuation of abandoned application Ser. No. 652,222, filed Jan. 26, 1976 and identically entitled.

BACKGROUND OF THE INVENTION

Auxiliary liquid-holding tanks usually are designed to be filled with enough liquid to operate, for about a day, emergency apparatus, such as stand-by engine-generators for hospitals, schools, etc. The usual systems for filling such "day tanks" from large reservoirs at lower levels comprise power-driven pumps and conduits which encounter several reliability-reducing problems: namely, loss of prime in the pump due to back-flow or conduit leakage, aggravated by long quiescent periods; and functional failure of components, due to gumming or drying of bearing lubricants, and corrosion of bearings, linkages and electrical-contact surfaces, etc. Heretofore, the pumps have generally been located without regard to their elevation, often on the top of the tank, a position conducive to loss of prime. Further, the inlet to the tank was often located above the pump-turn-on level, an arrangement also conducive to loss of prime in the supply system. Moreover, prior-art day-tank systems have also generally lacked means for readily testing the operability of the various controls and indicators to insure their dependable operation.

SUMMARY AND OBJECTS OF THE INVENTION

It is accordingly the principal object of this invention to provide an auxiliary-tank system in which the pump and its discharge connection to the tank are located below the pump-turn-on level so as to insure maintenance of a positive head of pressure in all parts of the input system.

Another object is to provide such a system with a controlled slow back-flow leakage to "exercise" the system by causing the pump to operate ("cycle") often enough to insure bearing lubrication and to prevent corrosive or similar effects from freezing or electrically insulating components against desired operations.

It is a further object to design the liquid-level-responsive mechanism so as to be manually movable to test the operability of the pump and various controls, indicators, and alarms.

Other objects and advantages will become apparent as the following detailed description proceeds.

DETAILED DESCRIPTION OF THE DISCLOSURE

Figure 1:
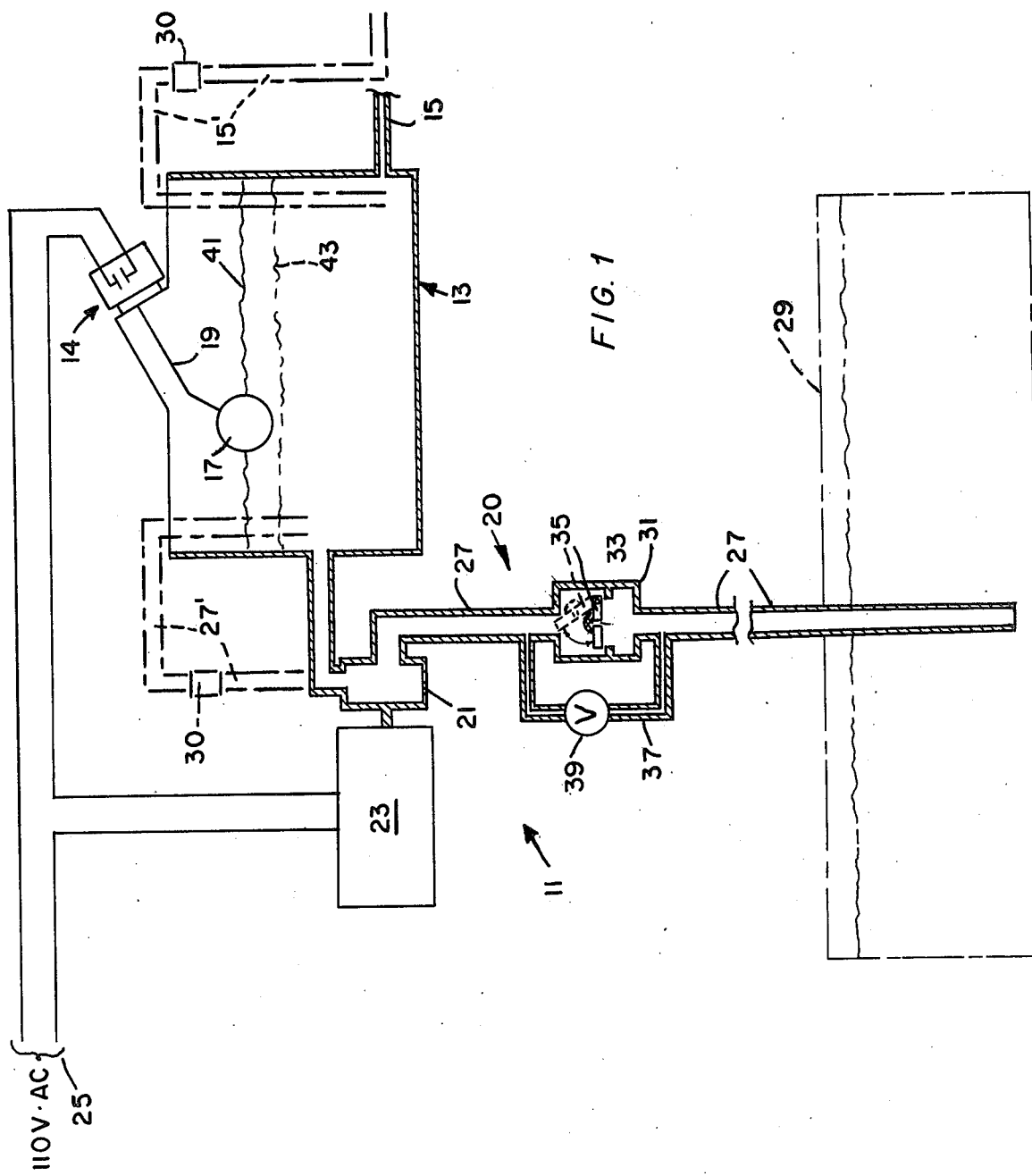
FIG. 1 is a largely schematic diagram of the basic system.

With reference now to the drawings, in FIG. 1 the numeral 11 generally designates the herein disclosed auxiliary liquid-tank system. System 11 comprises an auxiliary tank 13 having an outlet pipe 15 supplying liquid for any useful purpose as, for example, to apparatus such as fire-fighting sprinklers or an engine-generator unit (not shown). Tank 13 has associated therewith a plurality of switches (later described) represented by the single schematically shown switch 14, the same being operated by a liquid-level-controlling float 17 connected to switch 14 by arm 19.

The tank 13 is kept filled by a fluid-supply system generally designated 20, which comprises a conventional pump 21 driven by an AC electric motor unit 23. The motor unit 23 may include conventional elements, such as a trickle-charged storage battery and a DC-to-AC converter, which are automatically connected to the motor circuit in the event of failure of the normal power supply 25 for which this disclosed system may substitute. The liquid-supply system 14 has a conduit 27 extending from the pump 21 down into a large supply reservoir 29. The supply conduit 27 has inserted therein a check valve 31 to prevent back flow of liquid to the reservoir 29, which valve makes possible the use of a centrifugal pump in place of a more costly self-priming fluid-tight gear pump.

An essential and important feature of the present invention lies in providing for a slow back-flow leakage of liquid through and/or around the check valve 31. This leakage may be provided by a calibrated orifice 33 in the valve element 35 (or other valve part) and/or by a bypass conduit 37 including an adjustable valve 39. The orifice 33 may include a filter 41 to prevent clogging. The bypass valve 39, if employed with or substituted for the orifice 33, can vary the back flow from zero through slow back flow to rapid back flow, the last-mentioned flow being used to test operability of the supply system, or for quick drainage of the auxiliary tank.

The pump-controlling switch in part 15 is designed to cycle the pump to maintain the liquid level between the full level 41 and the pump-turn-on level 43. The cycling is controlled by the bleed-back rate to exercise the supply-system parts weekly, or more or less frequently as desired.

Figure 2:
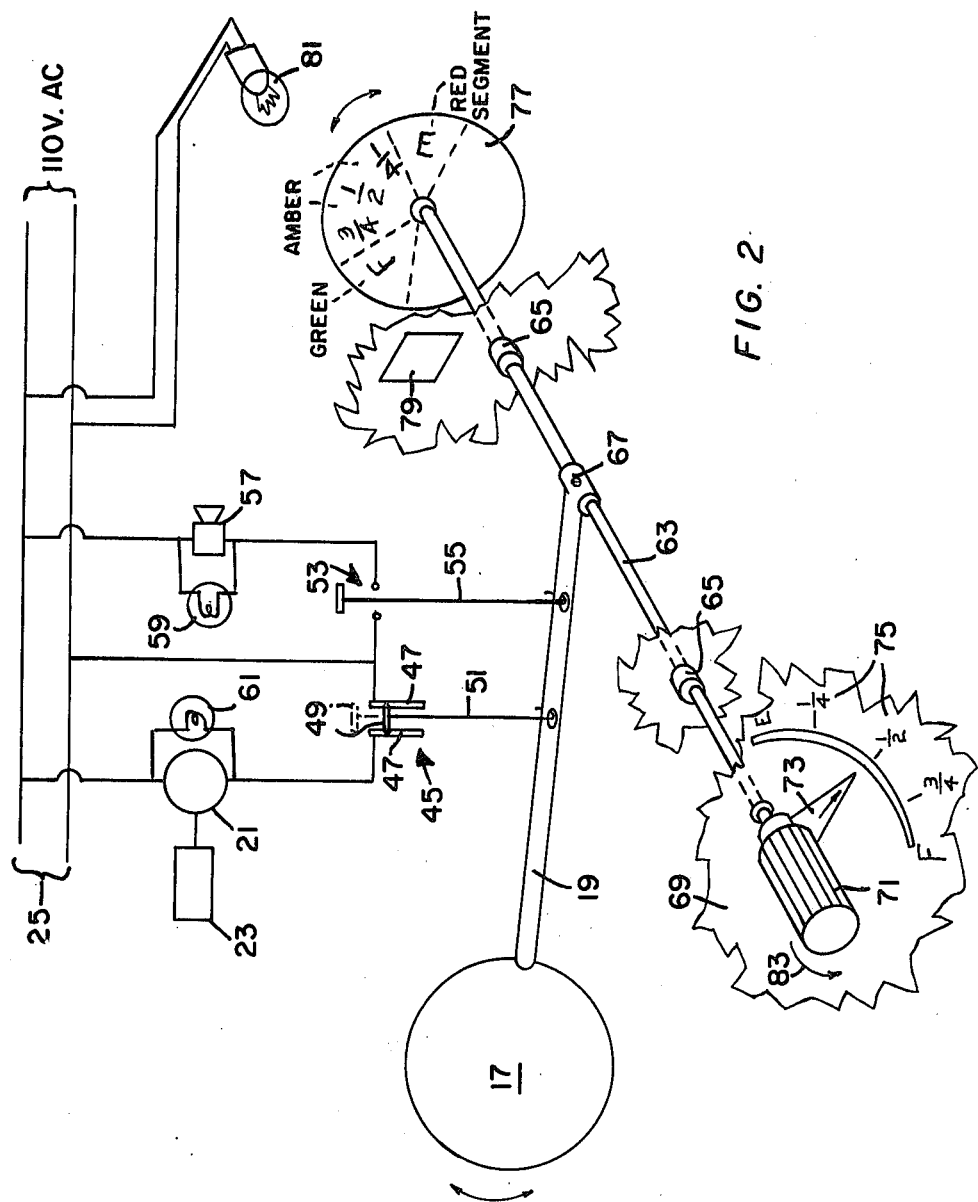
FIG. 2 is a largely schematic diagram of a preferred species of the circuitry, indicator, alarm and testing means usable with the system of FIG. 1.

FIG. 2 discloses in detail parts of the system of FIG. 1 associated with (but not shown in) part 14 of FIG. 1. As in FIG. 1, 17' is the float, 19' the float arm, 21' the liquid pump and 23' the pump motor and associated conventional automatic emergency controls (not shown). Numeral 45 generally designates the pump-controlling switch, which consists of a pair of contact bars 47 bridged by a wiping contact element 49. The contact element 49 is moved by a rod 51 between its CLOSED solid-line position to its OPEN broken-line position to cycle the pump. A second switch 53 is also operated by a rod 55 connecting it to the float arm 19. The switch 53 energizes the sonic alarm 57 and/or an optional (red) signal light 59 when the liquid level drops to an undesirable or unsafe level. Optionally a (green) light signal 61 may be connected in parallel with the pump motor to indicate pump operation.

Another important feature of the invention, as shown in FIG. 2, is the provision of a system for testing the operability of the apparatus. Said testing system comprises a rod 63 rotatable in stationary bearings 65. The float arm 19 is fixed at 67 to rod 63 to rotate the same. The rod 63 projects out through a wall 69 of the liquid tank and has fixed thereto a knob 71 and a pointer 73. The wall 69 carries liquid-level indicia 75. Additionally, but preferably alternatively, the rod 63 may carry a level-indicating (translucent) disc 77, which may be located either externally of or within the day tank and which may be viewed through a window 79 and be illuminated from behind by a lamp 81.

The testing operation is effected by manually turning the rod 63 in the direction of the arrow 83, which incidently submerges the float 17 while simulating an actual dropping of the fuel level. The test rotation at first will turn the pump ON and on further rotation toward the empty indication E will sound the alarm 57 and/or will light the (red) signal lamp 59. In place of, or in addition to the knob 71, the pointer 73 may be strengthened and/or lengthened, and be used as a lever to rotate the rod 63 during a test operation.

Figure 3:
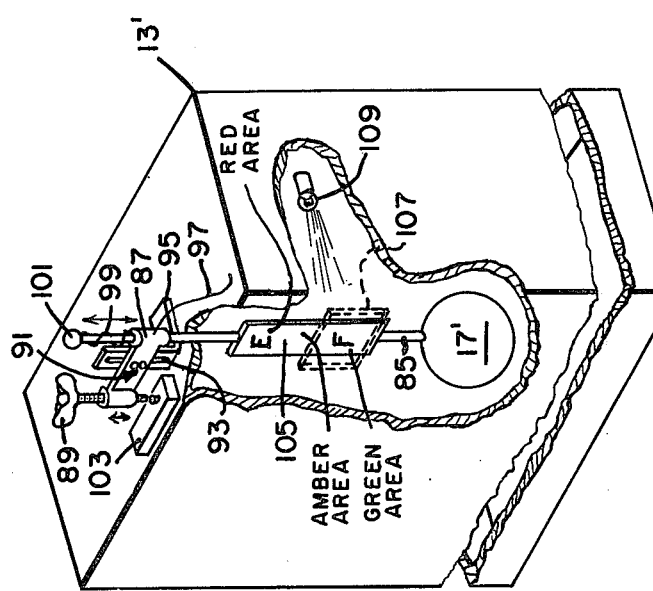
FIG. 3 is a partly schematic perspective view of a modified form of the showing of FIG. 2.

FIG. 3 is a modified form of the showing of FIG. 2. The float 17' operates, and can be testingly operated by, a vertical plunger rod 85. The rod 85 is guided in a vertical bore in a horizontal bar 87, which bar 87 carries a vertically adjustable thumb-screw 89 at its far end. The bar 87 is guided for slight vertical movements by pins 91 received in a slot 93 in an angle strap 95. The pins 91 have flanged heads (not visible) on their rear ends to hold the bar 87 against the face of the angle strap 95. A wire spring 97 urges the bar 87 toward its shown position. A compression coil spring 99, engaged between a knob 101 and the bar 87, exerts downward force on the bar to operate serially microswitches (in the box 103), which switches control the pump and the warning signal(s), as do switches 45 and 53 in FIG. 2. The spring 99 also permits manual depression of the rod 85 (to simulate actual level dropping) during a test operation, as described above. The plunger rod 85 also carries a plate 105 bearing level-indicating indicia viewable through a transparent window 107 in a wall of the tank 13'. The plate 105 can be made translucent and be illuminated by a lamp 109 in the day tank, or behind another window (not shown) in the tank wall opposite the window 107.

With reference again to FIG. 1, modified substitute inlet and outlet conduits for the tank 13 are shown in phantom for use if the tank is to hold flammable or other dangerous liquids and there is danger of conduit breakage by earthquakes, explosions, etc. The inlet conduit portion 27' rises above the liquid level 41 and its discharge end reaches below the pump-turn-on level 43. The outlet conduit portion 15' has the siphon configuration shown. And both substitute conduit portions have frangible pipe couplers 30 inserted therein above the full-tank level 41. A severe earthquake-like stress between the tank and other parts of the entire system would cause breaks at the couplers, rather than at points below the tank levels which would permit dangerous emptying of the tank on adjacent floor areas.

Having thus described my invention, I claim:

1. In a system for improving the reliability of an auxiliary tank for supplying liquid for useful functions, such as fueling an engine-generator, said system comprising a tank input supply-conduit system including a power-operated pump and a liquid-level-controlled switch for cycling said pump to maintain the liquid level in said tank between full and nearly full levels, the improvement comprising: a check-valve means in said input supply-conduit system, said check-valve means being constructed and arranged to provide slow back-flow through said supply-conduit system to cause periodic, exemplarily exercising of said auxiliary-tank system to maintain said system in lubricated and primed conditions.

2. The invention according to claim 1, said check-valve means having at least one small bleed passage through at least one of its relatively movable valve parts.

3. The invention according to claim 2, said small back-flow passage having a clog-preventing filter associated therewith.

4. The invention according to claim 1, at least a part of said check-valve means comprising a manually adjustable valve connected to bypass said check-valve to vary the back-flow bleed rate from zero through normal slow flow to a fast-flow tank-system-testing or draining operation.

5. The invention according to claim 1, and additionally comprising: a float for sensing liquid level in said liquid tank, float-operated means functionally connected to the switch of said pump, and at least one additional switch operatively connected to said float-operated means to operate an alarm signal upon the liquid level of the tank dropping to an objectionally low level.

6. The invention according to claim 5, and additionally comprising level-indicating means operatively connected to said float-operated means.

7. The invention according to claim 6, said float-operated means additionally comprising manually engageable means for submerging said float in liquid-level-dropping-simulating manner to test the operability of the parts of the system normally controllable by said float-operated means.

8. The invention according to claim 7, said manually engageable means being outside of said tank and being on the end of a shaft rotatable by a lever connecting said float thereto, said manually engageable means including a level-indicating arm manually rotatable to effect the testing operation.

9. The invention according to claim 7, said manually engageable means comprising a vertically movable push rod connected to and extending upwardly from said float and above the top of said tank for manual depression of said push rod and float during an operational test.

10. The invention according to claim 1 and additionally comprising siphon-like conduit sections in both the inlet and the outlet conduit parts of said tank system, and a frangible coupler inserted in each of said siphon-like conduit sections above the full liquid-level of said tank, said couplers being adapted to break upon severe stress to prevent dangerous breakage in conduit parts below the full liquid-level of said tank.

* * * * *